US009015378B2

(12) United States Patent  
Le Grand et al.

(10) Patent No.: US 9,015,378 B2
(45) Date of Patent: Apr. 21, 2015

(54) DETERMINING SENSOR INFORMATION IN THE BACKGROUND ON A MOBILE DEVICE

(71) Applicant: Google Inc., Mountain View, CA (US)

(72) Inventors: Etienne Le Grand, Mountain View, CA (US); Mathias Agopian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/968,402

(22) Filed: Aug. 15, 2013

(65) Prior Publication Data

US 2014/0343896 A1 Nov. 20, 2014

Related U.S. Application Data

(60) Provisional application No. 61/823,715, filed on May 15, 2013.

(51) Int. Cl.
  *G06F 3/00* (2006.01)
  *G06F 5/00* (2006.01)
  *G06F 11/30* (2006.01)

(52) U.S. Cl.
  CPC .................... *G06F 11/3065* (2013.01)

(58) Field of Classification Search
  None
  See application file for complete search history.

(56) References Cited

U.S. PATENT DOCUMENTS

| 8,306,514 | B1* | 11/2012 | Nunally ................... 455/414.2 |
| 2008/0234935 | A1* | 9/2008 | Wolf et al. ................. 701/216 |
| 2009/0193182 | A1* | 7/2009 | Nitta ........................... 711/103 |
| 2009/0240766 | A1* | 9/2009 | Kikkawa et al. ............ 709/203 |
| 2010/0302028 | A1 | 12/2010 | Desai et al. |
| 2010/0323657 | A1* | 12/2010 | Barnard et al. ........... 455/404.1 |
| 2011/0093925 | A1* | 4/2011 | Krishnamoorthy et al. ...... 726/4 |
| 2013/0090151 | A1* | 4/2013 | Ngai et al. .................... 455/574 |
| 2013/0297926 | A1* | 11/2013 | Eaton et al. ................... 713/100 |

OTHER PUBLICATIONS

Priyantha, Bodhi et al., EERS: Energy Efficient Responsive Sleeping on Mobile Phones, Proceedings of PhoneSense 2010, Zurich, Switzerland, Nov. 2010.

* cited by examiner

*Primary Examiner* — Elias Mamo
(74) *Attorney, Agent, or Firm* — McDonnell Boehnen Hulbert & Berghoff LLP

(57) ABSTRACT

Methods and systems for acquiring and batching sensor data using a mobile device are described. In one example, a system in a mobile device is provided. The system includes one or more sensors, a memory, a sensor processor, and a main application processor. The sensor processor is configured to determine sensor data using the one or more sensors on an interval basis and store the sensor data into one or more first-in, first-out (FIFO) queues. Additionally, the sensor processor is configured to replace at least a portion of the stored sensor data if a main application processor of the mobile device does not request the stored sensor data within a certain amount of time. The main application processor is configured to receive data indicating a request for sensor data for a recent time period and, in response, to retrieve the sensor data from the one or more FIFO queues.

18 Claims, 7 Drawing Sheets

DETERMINING SENSOR INFORMATION IN THE BACKGROUND ON A MOBILE DEVICE

CROSS-REFERENCE TO RELATED APPLICATIONS

This application claims the benefit of U.S. Provisional Application No. 61/823,715 filed on May 15, 2013, the entirety of which is herein incorporated by reference.

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging, positioning, and relative motion determination. A few examples of sensors that may be found in a mobile device include accelerometers, gyroscopes, global positioning systems (GPSs), compasses, microphones, cameras, Wi-Fi sensors, magnetic sensors, and pressure sensors, among other types of sensors.

Applications that are configured to operate on a mobile device may take advantage of the wide variety of available sensors to perform various functions. As an example, many applications take advantage of positioning sensors available on a mobile device to provide location-based services. A few of the most common mobile location-based services include mapping, navigation, and searching for nearby restaurants or stores. As another example, some mobile applications track health and fitness information using sensors of a mobile device. Other applications use sensors in mobile devices to facilitate monitoring environmental conditions. The applications described above are just a few of the many examples of applications that utilize sensors of a mobile device.

SUMMARY

Some mobile devices utilize a main application processor to acquire sensor data. However, using the main application processor to acquire sensor data can be computationally expensive in terms of power. If, for example, a mobile phone is constantly or frequently trying to acquire sensor data using the main application processor, the mobile phone may quickly consume its available battery power. Additionally, in some examples, it may be desirable to be able to retrieve sensor data for a recent time period. Such sensor data may be processed by a mobile device to determine a recent history of the mobile device, for example.

Accordingly, described herein are methods and systems for efficiently acquiring and batching sensor data using a mobile device. In some instances, sensor data may be acquired using a sensor processor and stored in one or more first-in, first-out (FIFO) queues. The sensor processor may be configured to acquire and store the sensor data without utilizing the main application processor, such that the main application processor may remain in an inactive state or sleep state while the sensor data is acquired in the background. If sensor data associated with a previous time period is desired, the sensor data may be retrieved from a memory and provided to the main application processor.

In one example aspect, a mobile device is provided. The mobile device includes one or more sensors, a memory, a sensor processor, and a main application processor. The sensor processor is configured to determine sensor data using the one or more sensors on an interval basis and store the sensor data into one or more first-in, first-out (FIFO) queues in the memory as the sensor data is determined. Additionally, the sensor processor is configured to replace at least a portion of the stored sensor data if a main application processor of the mobile device does not request the stored sensor data within a certain amount of time. The main application processor is configured to receive data indicating a request for sensor data for a recent time period and, in response to receiving the data indicating the request, retrieve the sensor data for the recent time period from the one or more FIFO queues.

In another example aspect, a method of batching sensor data while a main application processor of a mobile device is in an inactive state is provided. The method involves receiving, by a sensor processor and from the main application processor, data indicating a request to collect sensor data using one or more sensors. The sensor processor is configured to collect sensor data using less power than the main application processor uses when determining sensor data. The method also includes in response to receiving the data indicating the request, the sensor processor determining sensor data using the one or more sensors on an interval basis. The method further includes storing, by the sensor processor, the determined sensor data into one or more first-in, first out (FIFO) queues of a memory. Additionally, the method includes determining, by the sensor processor, that a given one of the one or more FIFO queues is full and, in response to determining that a given one of the one or more FIFO queues is full, discounting, by the sensor processor, a portion of the sensor data that is stored in the given FIFO queue of the one or more FIFO queues. The portion of the sensor data that is stored in the given FIFO queue may be discounted such that additional sensor data for a subsequent interval may be stored into the given FIFO queue.

In still another example aspect, a computer-readable medium having stored thereon instructions that, when executed by a sensor processor, cause the sensor processor to perform functions is provided. The functions include receiving, from a main application processor of a mobile device, data indicating a request to collect sensor data using one or more sensors. The functions also include in response to receiving the data indicating the request, determining sensor data using the one or more sensors on an interval basis. The functions further include storing the determined sensor data into one or more first-in, first out (FIFO) queues of a memory. Additionally, the functions include determining that a given one of the one or more FIFO queues is full and, in response to determining that a given one of the one or more FIFO queues is full, discounting a portion of the sensor data that is stored in the given FIFO queue of the one or more FIFO queues. The portion of the sensor data that is stored in the given FIFO queue may be discounted such that additional sensor data for a subsequent interval may be stored into the given FIFO queue.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
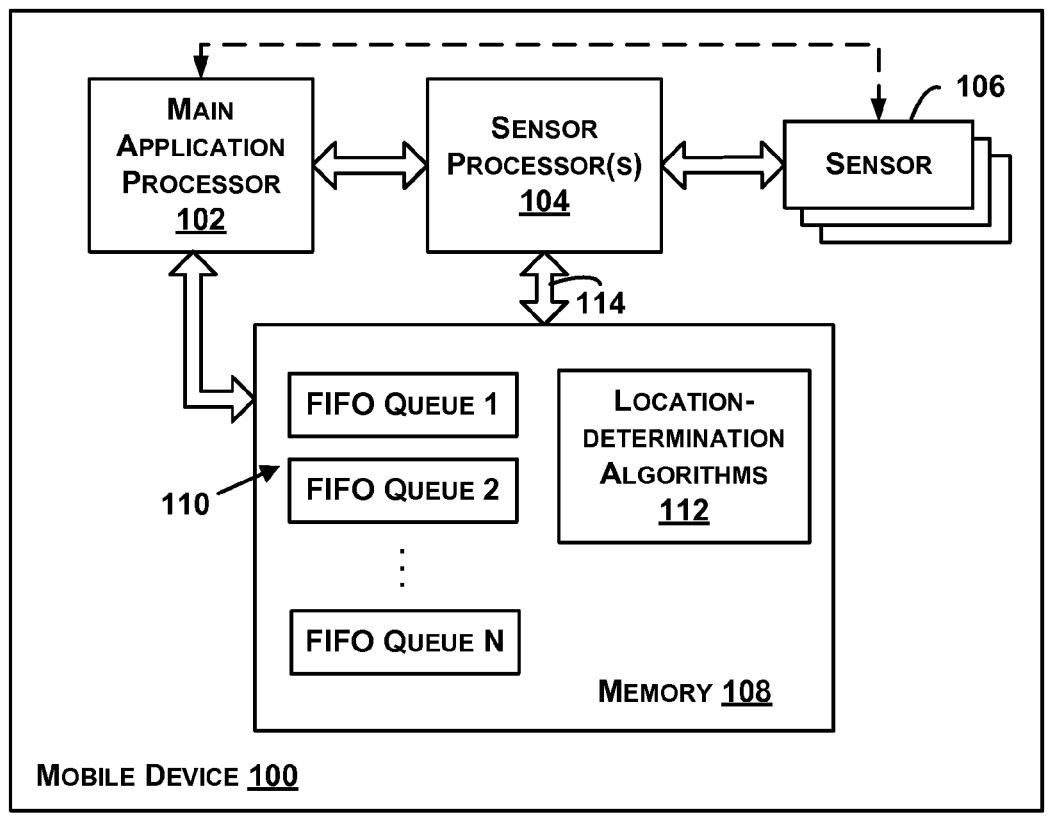
FIG. 1 illustrates an example mobile device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for efficiently acquiring and batching sensor data using a mobile device. In some instances, sensor data may be acquired using a sensor processor and stored in one or more first-in, first-out (FIFO) queues. The sensor processor may be configured to acquire and store the sensor data in the background even when there is no active application on the mobile device requesting the sensor data. If sensor data associated with a previous time period is desired, the sensor data may be retrieved from a memory and provided to the main application processor.

In some examples, if sensor data is not subsequently requested by the main application processor, the sensor processor may be configured to discount or replace the stale sensor data. For instance, if the main application processor remains inactive and the sensor data is not requested within a certain amount of time, the sensor processor may overwrite the stored sensor data. In another instance, the sensor processor may discount or replace the stored sensor data when one or more of the FIFO queues are filled, such that additional sensor data may be acquired and stored.

In one example, the sensor processor may be configured to consume less power when acquiring sensor data than the main application processor consumes when acquiring sensor data. Additionally, the sensor processor may be configured to acquire and store sensor data while the main application processor is in a sleep state or inactive state. Using the sensor processor to acquire and batch sensor data while allowing the main application processor to remain in an inactive state may therefore help conserve battery life of the mobile device while collecting sensor data on the mobile device.

Furthermore, collecting sensor data in the background, even when there is no active consumer (e.g., application of the device or component of the device other than the sensor processor) of the sensor data, may provide applications of the mobile device with access to sensor data for a recent time period. Such sensor data may provide useful context information about a recent state of the mobile device or behavior of a user of the mobile device. For instance, analyzing stored location data, such as GPS logs or logs of nearby wireless access points, may allow a location determination algorithm to quickly determine an estimate of the geographic location of the mobile device based on a path of the mobile device over a recent time period (e.g., the past thirty seconds, five minutes, etc.). Other use cases are also contemplated.

Additional functionalities and examples of the devices and methods are also described hereinafter with reference to the accompanying figures.

Referring now to the figures, FIG. 1 illustrates an example mobile device 100. The mobile device 100 may represent any type of mobile computing device. By way of example, the mobile device 100 may be a mobile phone. However, the example is not meant to be limiting. In other instances, the mobile device 100 may be a laptop computer, tablet, wearable computing device, or other type of computing device.

As shown in FIG. 1, the mobile device 100 may include a main application processor 102, one or more sensor processors 104, one or more sensors 106, and a memory 108. The main application processor 102 and the one or more sensor processors 104 may be any type of processor, such as a microprocessor, digital signal processor, multicore processor, etc., coupled to the memory 108.

Additionally, the one or more sensor processors 104 may be configured to utilize the one or more sensors 106 to acquire and store sensor data using less power than the main application processor 102 consumes when utilizing the one or more sensors 106 to acquire and store sensor data. For instance, the one or more sensor processors 104 may be configured to transition from inactive or idle states to active states more quickly than the main application processor 102, allowing the one or more sensor processors 104 to consume less average power when periodically using the one or more sensors 106 to acquire sensor data.

In one example, any of the one or more sensor processors 104 may be a processor that is a component of a sensor. For instance, a given processor of the one or more sensor processors 104 may be a processor that is part of an accelerometer chip. Further, any of the one or more sensor processors 104 may be a dedicated sensor processor that is configured to acquire and store data using multiple sensors of the one or more sensors 106.

In one embodiment, the mobile device 100 may include a large system on a chip (SoC) having a main application processor as well as a more efficient, smaller, sensor processor. In another embodiment, the one or more sensor processors 104 may be a low-power core that is a component of the main application processor 102. For instance, the main application processor 102 may be a multi-core processor and a given core of the multi-core processor may be reserved for use as a sensor processor.

The one or more sensors 106 may include any of a variety of types of analog and/or digital sensors. For instance, the one or more sensors 106 may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. In one example, the Wi-Fi sensor may be configured to scan for available wireless access points within a wireless range of the mobile device by broadcasting one or more probe requests.

The memory 108 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. Although the memory 108 is shown as a single component, in other examples, the mobile device may include multiple memories (not shown). For example, the main application processor 102 may be coupled to a first memory and the one or more sensor processors 104 may be coupled to a second memory. In such an example, the main application processor 102 may retrieve data stored in the second memory by requesting the data from the one or more sensor processors 104.

The memory may include one or more FIFO queues 110 and one or more location-determination algorithms 112. Each of the one or more FIFO queues 110 may be implemented in the form of a set of read and write pointers, data storage, and control logic. For instance, the data storage may be SRAM, flip-flops, latches or any other suitable form of storage, and the control logic may specify how the one or more sensor processors 104, and optionally the main application processor 102, may read/write to the date storage.

In one example, the one or more sensor processors 104 may be configured to determine sensor data using the one or more sensors 106 on an interval basis. As an example, the one or more sensor processors 104 may acquire data using each of the one or more sensors 106 once per second, multiple times per second, once per minute, multiple times per minute, etc. However, in other examples, each of the one more sensors 106 may be used to acquire data at different respective intervals. For instance, the one or more sensor processors 104 may be configured to acquire sensor data using a GPS once per minute, acquire sensor data using an accelerometer once every tenth of a second, and acquire sensor data using a Wi-Fi sensor once every two minutes. The one or more sensor processors 104 may also be configured to store the acquired sensor data into one or more FIFO queues as the sensor data is determined.

The one or more sensor processors 104 may be configured to determine the sensor data while the main application processor is inactive and the mobile device is in a sleep mode. For example, the one or more sensor processors 104 may be configured to acquire sensor data using the one or more sensors 104 without requiring that the main application processor be transitioned into an active state. In one instance, the one or more sensor processors 104 may be configured to acquire sensor data without having an application of the mobile device specifically requesting that sensor data be acquired.

In some examples, the one or more sensor processors 104 may also be configured to discount a portion of the sensor data that is stored in a given FIFO queue of the one or more FIFO queues 110 when the given FIFO queue is full, such that additional sensor data for a subsequent interval may be stored into the given FIFO queue. By way of example, if a sensor processor is configured to acquire sensor data using an accelerometer once every tenth of a second and store the sensor data in a FIFO queue that can hold three thousand elements, the FIFO queue may be full after storing five minutes of sensor data. To facilitate storing subsequently acquired sensor data, the sensor processor may be configured to erase or condense the stored sensor data, as is further described with reference to FIGS. 3A-4B below.

In one instance, the one or more sensor processors 104 may be configured to continuously acquire the sensor data and store the acquired sensor data into the one or more FIFO queues 110. In another instance, the one or more sensor processors 104 may be configured to acquire sensor data for a predetermined length of time in response to receiving a request from the main application processor 102. For example, the one or more sensor processors 104 may receive data from the main application processor 102 indicating a request to acquire and store sensor data for a period of five minutes. In still another instance, the one or more sensor processors 104 may be configured to acquire and store sensor data at regular scheduled times. For example, the one or more sensor processors 104 may be configured to acquire and store sensor data between the hours of 8 AM and 10 AM and between the hours of 4 PM and 6 PM every day, or between the hours of 8 AM and 8 PM every day.

In some instances, the one or more sensor processors 104 may also be configured to process data received from one or a combination of the one or more sensors 106, and store the processed sensor data in the one or more FIFO queues. For example, a given sensor processor may be configured to fuse sensor data from at least two of the one or more sensors 106 to determine an output, and store the determined output in a FIFO queue. A particular example of a type processing that a sensor processor may perform based on data acquired from a combination of sensors is described below with reference to FIG. 5.

The main application processor 102 may also be configured to retrieve sensor data for a recent time period in some examples. For instance, the main application processor 102 may be configured to receive data indicating a request for sensor data for a recent time period. In response to receiving the request for sensor data for a recent time period, the main application processor 102 may be configured to retrieve the sensor data for the recent time period from the one or more FIFO queues.

As an example, the main application processor 102 may receive data indicating a request for GPS and Wi-Fi sensor data for the past thirty seconds. The request may be received from an application of the mobile device 100 that estimates a geographic location of the mobile device 100, for instance. Upon retrieving the GPS and Wi-Fi sensor data from one or more FIFO queues, the main application processor 102 may be caused to estimate a geographic location of the mobile device 100 using the retrieved sensor data.

In one example, the memory 108 may store one or more location-determination algorithms that the main application processor 102 may execute to estimate the geographic location of the mobile device 100. For instance, the main application processor 102 may use a location-determination algorithm to determine a location of the mobile device 100 based on the presence and/or location of one or more known wireless access points within a wireless range of the mobile device 100. In one example, the retrieved sensor data may include data indicating an identity of one or more wireless access points (e.g., a MAC address) and intensity of signals received (e.g. received signal strength indication) from each of the one or more wireless access points at various time instances over a period of time. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the mobile device 100 may be determined for each time instance over the period of time.

In another example, the retrieved sensor data may include data indicating a fingerprint based on a pattern of signals received from one or more wireless access points. The main application processor 102 may execute a location-determination algorithm that involves comparing the fingerprint to one or more known calibration points for which a geographic location is known. Various deterministic algorithms, such as nearest neighbor in signal space (NNSS), k-nearest neighbor (KNN), and weighted k-nearest neighbor (WKNN), may be used to determine a closest calibration point to the fingerprint. Probabilistic methods may also be used to determine a most likely location based on a relationship between the fingerprint and known calibration points.

In another instance, the main application processor 102 may use a location-determination algorithm to determine a location of the mobile device 100 based on nearby cellular base stations. For example, the retrieved sensor data may identify the cell from which the mobile device 100 last received signal from a cellular network at a given time. In an example in which the one or more sensors 106 include a cellular radio communication component, the cellular radio communication component may be configured to measure a round trip time (RTT) to a base station providing the signal. Thus, the retrieved sensor data may also include a RTT. In such an example, the main application processor 102 may be caused to combine this information with the identified cell to determine a location estimate.

In some examples, the main application processor 102 may combine sensor data determined using a combination of the one or more sensors 106, such as a combination of a Wi-Fi sensor, GPS, and cellular radio communication component, to estimate a location of the mobile device 100.

As shown in FIG. 1, each of the main application processor 102, one or more sensor processors 104, one or more sensors 106, and memory 108 may be coupled together by one or more system buses, networks, or other connection mechanisms 114.

In some implementations, the mobile device 100 may include a device platform (not shown), which may be configured as a multi-layered Linux platform. The device platform may include different applications and an application framework, as well as various kernels, libraries, and runtime entities. In other examples, other formats or systems may operate the mobile device 100 as well.

Figure 2:
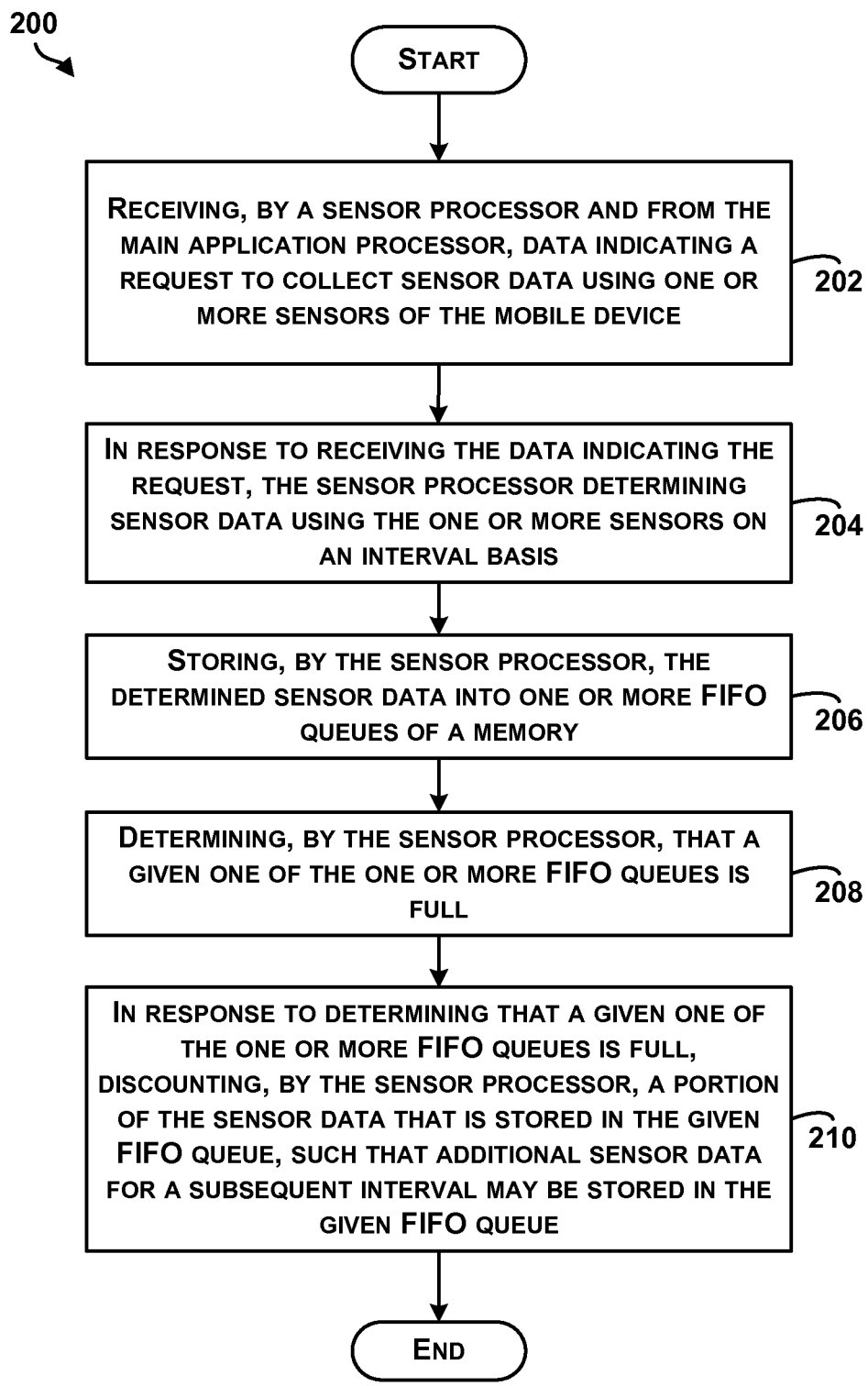
FIG. 2 is a block diagram of an example method for batching sensor data.

FIG. 2 is a block diagram of an example method 200 for batching sensor data. Method 200 shown in FIG. 2 presents an embodiment of a method that could be used or implemented by the one or more sensor processors 104 of FIG. 1, for example, or more generally by any computing device. In some instances, the method 200 may be used to batch sensor data while a main application processor of a mobile device is in an inactive state. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving, by a sensor processor and from the main application processor, data indicating a request to collect sensor data using one or more sensors of the mobile device. In one example, the sensor processor may receive data indicating a request to collect sensor data using one or any combination of sensors for a predetermined length of time such as the next five minutes, hour, day, week, etc. In another example, the sensor processor may receive data indicating a request to collect sensor data until a subsequent request to stop collecting sensor data is received. Optionally, the data indicating the request may specify which of the one or more sensors to use to collect sensor data and/or how often to use each of the respective sensors to collect the sensor data (e.g., at what respective interval). In some embodiments, the data indicating the request may indicate that the sensor processor should collect sensor data using on the one or more sensors continuously.

Additionally, the sensor processor may be configured to collect sensor data using less power than the main application processor uses when determining sensor data. The sensor processor may also be configured to collect the sensor data using the one or more sensors while the main application processor is in an inactive state.

At block 204, the method 200 includes in response to receiving the data indicating the request, the sensor processor determining sensor data using the one or more sensors on an interval basis. In one example, the one or more sensors may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. As discussed, above, the sensor processor may determine sensor data using the one or more sensors on an interval basis. Each sensor may be used to collect sensor data at the same interval or at different intervals. In some instances, determining the sensor data using the one or more sensors may involve combining sensor data received from at least two of the one or more sensors. Therefore, in some examples, the determined sensor data may be processed sensor data.

At block 206, the method 200 includes storing, by the sensor processor, the determined sensor data into one or more FIFO queues of a memory. In one example, sensor data for each type of sensor used may be stored in a separate FIFO queue. In another example, sensor data determined using two or more sensors may be stored within the same FIFO queue. For example, a given FIFO queue may store both accelerometer data and gyroscope data. In an instance in which determining the sensor data involves performing sensor fusion or otherwise combining or processing the sensor data, the processed sensor data may be stored in one or more FIFO queues.

At block 208, the method 200 includes determining, by the sensor processor, that a given one of the one or more FIFO queues is full. In one example, each of the one or more FIFO queues may be implemented as a circular queue having a read address register and a write address register. Initially, the read address register and the write address register for a given FIFO queue may each point to a first memory location. As elements are added to or removed from the circular queue, the positions of the read address register and write address register may advance around the circular queue. If the write address register progresses around the circular queue faster than the read address register to a point where the read address register and the write address register point to a common memory location again, the given FIFO queue is said to be full. Control logic associated with the FIFO may trigger an indication to the sensor processor that the given FIFO queue is full. Alternatively, the sensor processor may be configured to determine whether the given FIFO queue is full by reading an "isFull" Boolean parameter.

In one instance, sensor data may remain in the one or more FIFO queues until the sensor data is requested by the main application processor. If sensor data for a given FIFO queue is not requested by the main application processor, the given FIFO queue may fill up once the maximum number of elements for the given FIFO queue has been reached.

At block 210, the method 200 includes in response to determining that a given one of the one or more FIFO queues is full, discounting, by the sensor processor, a portion of the sensor data that is stored in the given FIFO queue, such that additional sensor data for a subsequent interval may be stored in the given FIFO queue. In some examples, if sensor data stored in the given FIFO queue is not subsequently requested by the main application processor, the sensor processor may be configured to discount the stale sensor data. FIGS. 3A-4B are conceptual illustrations of discounting a portion of sensor data.

Figure 3A:
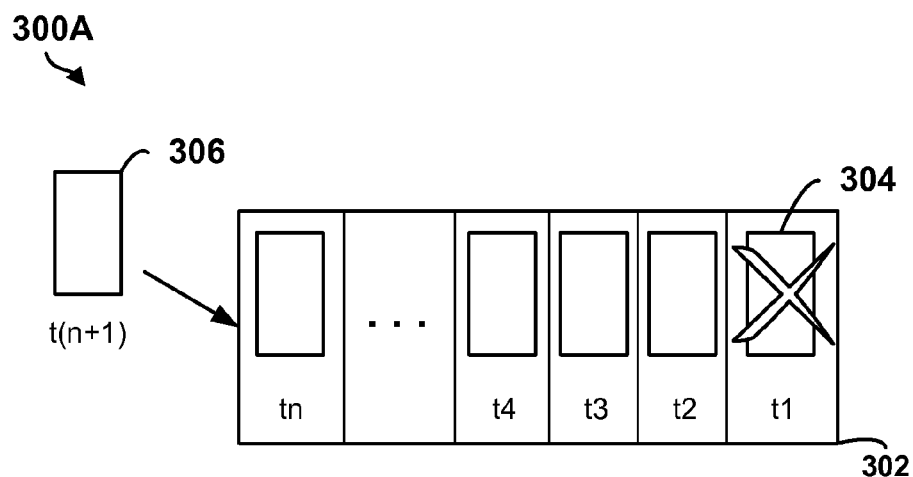
FIGS. 3A-4B are example conceptual illustrations of discounting a portion of sensor data.
Figure 3B:
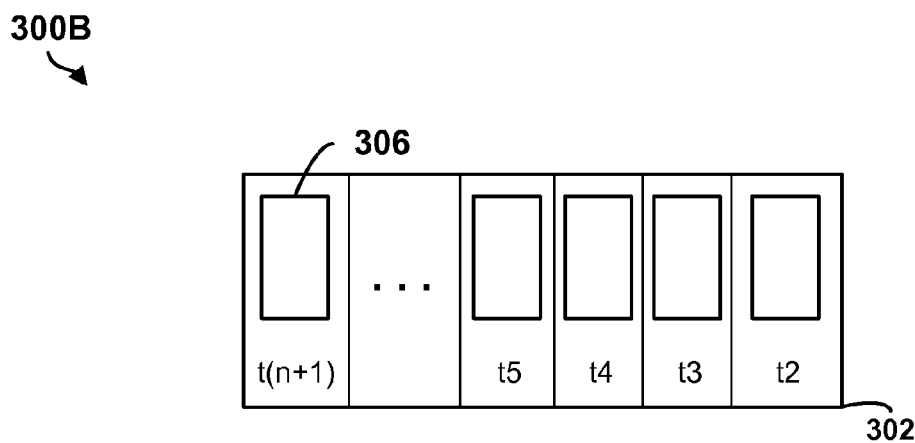

As shown in the conceptual illustration 300A of FIG. 3A, a number "n" elements of sensor data may be stored in a FIFO queue 302. Each of the elements of sensor data may have been captured during a time period from time "t1" to "tn". Since the FIFO queue 302 is full, a sensor processor may be configured to discount data stored in the FIFO queue 302 by erasing or removing an element 304 stored at the front of the FIFO queue 302. Erasing the element 304 may allow an element 306 of sensor data that was determined at time "t(n+1)" to be stored in the queue 302. As shown in the conceptual illustration 300B of FIG. 3B, after the element 304 has been erased, the element 306 may be stored at the end of the FIFO queue 302. In other examples, multiple elements from the front of the FIFO queue may be erased simultaneously.

Figure 4A:
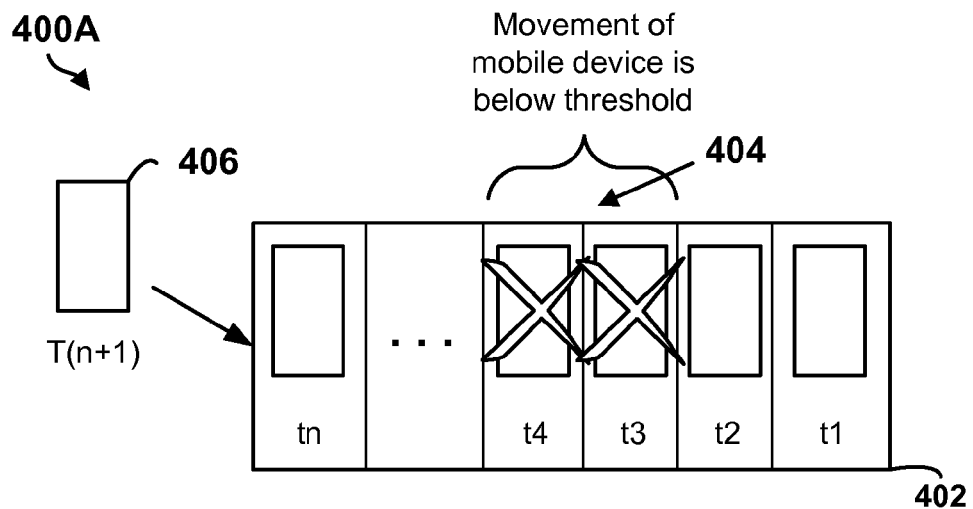
Figure 4B:
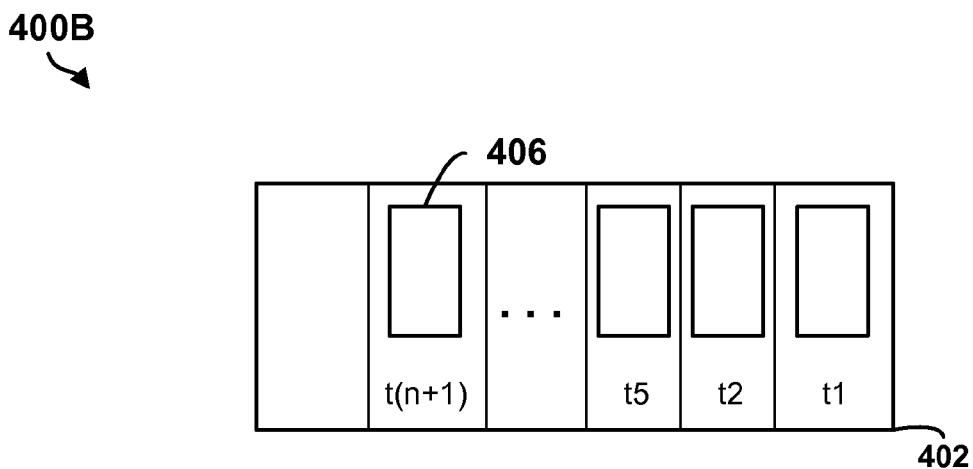

In some instances, elements of sensor data may be erased from other positions of a FIFO queue. For example, FIGS. 4A and 4B illustrate an example in which a portion of sensor data may be removed from positions other than the front of a FIFO queue. As shown in the conceptual illustration 400A of FIG. 4A, a number "n" of elements of sensor data may be stored in a FIFO queue 402. Each of the elements of sensor data may have been captured during a time period from "t1" to "tn". Since the FIFO queue 402 is full, a sensor processor may be configured to remove multiple elements 404 of sensor data from the FIFO queue 404.

In one instance, the sensor processor may determine that the elements 404 of sensor data are indicative that the mobile device is at rest for an elapsed period of time. For example, if the elements 404 include accelerometer readings that are below a threshold, the sensor processor may determine that the elements 404 indicate that the mobile device was at rest during the elapsed period of time. As another example, if the elements 404 include GPS readings, the sensor processor may determine that a difference between the GPS readings is below a threshold. In some instances, the sensor processor may determine that the elements 404 are associated with sensor data captured when the mobile device was at rest based on a time stamp associated with the elements 404. For example, if other sensor data stored in a separate FIFO queue includes GPS readings that are indicative that the mobile device is at rest during a given time period, the sensor processor may determine that the elements 404 of sensor data were also captured during the time period and, as a result, remove the elements 404.

As shown in conceptual illustration 400B of FIG. 4, after the elements 404 have been removed from the FIFO queue 402, the element 406 may be stored at the end of the FIFO queue.

In another example, sensor data that is stored in a FIFO queue may be downsampled to free up space in the FIFO queue. For example, if a FIFO queue has a maximum capacity of one hundred elements and the FIFO queue is determined to be full, the sensor processor may remove every other element to downsample the sensor data. As a result, the FIFO queue may be able to store an additional fifty elements of sensor data. In other instances, the downsampling may be performed by averaging or otherwise combining portions of the stored sensor data. For example, a first and second element may be averaged and the first and second element may be replaced by the average, a third and fourth element may be averaged and the third and fourth element may be replaced by the average, and so forth.

Figure 5:
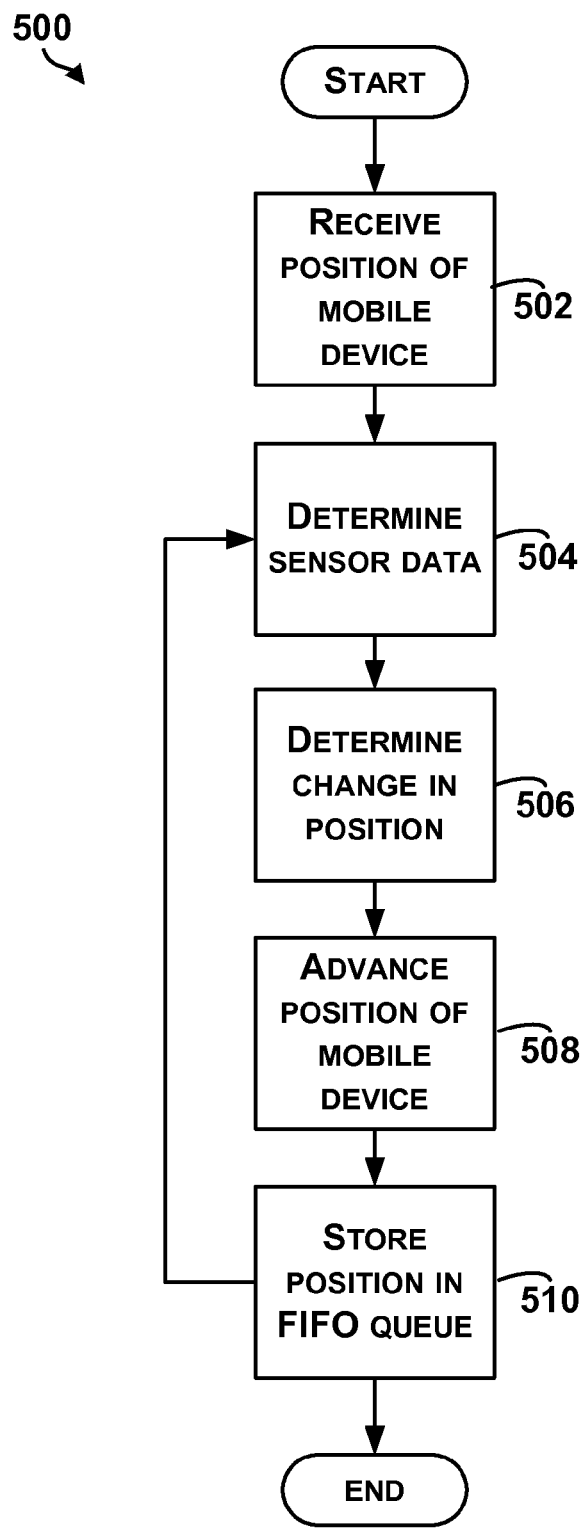
FIG. 5 is a flow chart of an example method of combining sensor data from two sensors.

As described above, in some examples a sensor processor may be configured to process sensor data received from two or more sensors and store the processed sensor data in a FIFO queue. FIG. 5 is a flow chart of an example method 500 of combining sensor data from two sensors.

As shown in FIG. 5, initially at block 502, the method 500 may include receiving a position of a mobile device. For example, a sensor processor of the mobile device may receive a geographic estimate of the location of the mobile device from a main application processor of the mobile device.

At block 504, the sensor processor may determine sensor data using one or more sensors of the mobile device. For purposes of illustration, consider an example in which the sensor processor determines sensor data using an accelerometer and a gyroscope once every tenth of a second. At block 506, the sensor processor may fuse the sensor data determined using the accelerometer and the gyroscope to determine a change in position of the mobile device. In one instance, combining the sensor data may involve determining a number of steps that a user of the mobile device has taken based on accelerometer readings for a period of two seconds. Additionally, an average orientation of the mobile device over the same two second period may be determined based on sensor data from the gyroscope. Based on the number of steps and average orientation during the number of steps, a change in position may be determined.

At block 508, the sensor processor may update the position of the mobile device by advancing the position of the mobile device based on the calculated change in position of the mobile device. For example, if at block 506 it is determined that the mobile device has been moved two steps north, the sensor processor may calculate a position that is two meters north of the position received at block 502. The calculated position may then be stored in a FIFO queue at block 510.

Optionally, the method 500 may proceed by looping back through blocks 504 to 510 to calculate a new position of the mobile device. During the subsequent iterations, at block 508, the position of the mobile device may be advanced based on the most recent position of the mobile device that was stored in the FIFO queue (as opposed to the initial position received at block 502 during the first iteration).

The example method 500 provides one example of a type of sensor fusion that may be performed, but the example method 500 is not meant to be limiting. Other types of sensor fusion are also contemplated.

Figure 6:
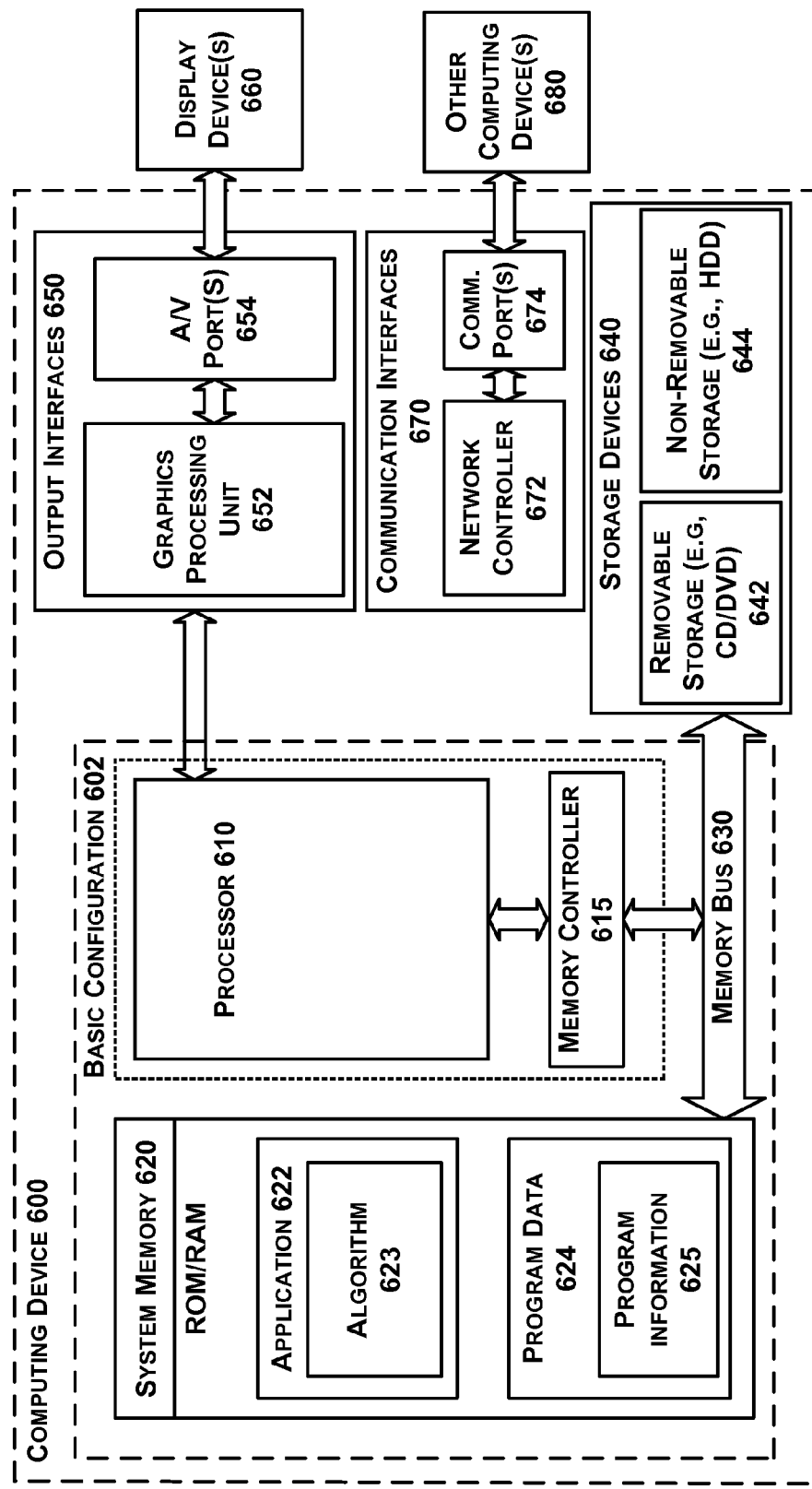
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be implemented to determine sensor data using one or more sensor processors or perform any of the functions described above with reference to FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include an algorithm 623 that is arranged to batch sensor data, in accordance with the present disclosure. Program data 624 may include program information 625 that could be directed to any number of types of data. For instance, application 622 may execute an algorithm that is configured to determine sensor data using one or more sensors and store the sensor data into one or more FIFO queues. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer, including both laptop computer and non-laptop computer configurations, or a server.

Figure 7:
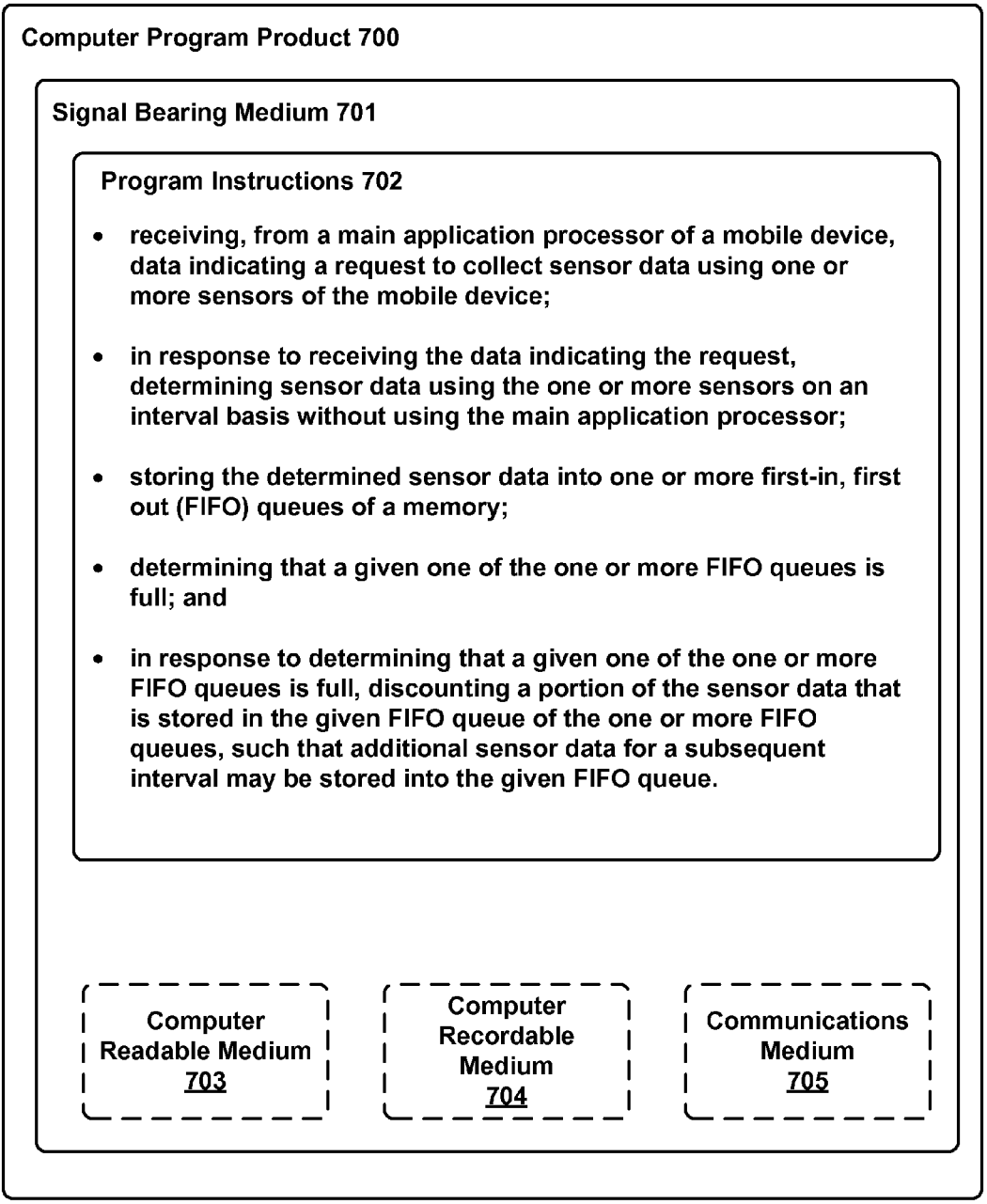
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer-readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A mobile device comprising:
   one or more sensors;
   a memory;
   a sensor processor, the sensor processor configured to:
      receive sensor data using the one or more sensors on an interval basis,
      store the sensor data into one or more first-in, first-out (FIFO) queues in the memory as the sensor data is received,
      determine that one or more elements of the sensor data stored in a given FIFO queue are indicative that the mobile device is at rest for an elapsed period of time, and
      based on determining that the one or more elements of the sensor data stored in the given FIFO queue are indicative that the mobile device is at rest for an elapsed period of time, replace at least a portion of the stored sensor data if a main application processor of the mobile device does not request the stored sensor data within a certain amount of time; and
   a main application processor, the main application processor configured to:
      receive data indicating a request for sensor data for a recent time period, and
      in response to receiving the data indicating the request, retrieve the sensor data for the recent time period from the one or more FIFO queues.

2. The mobile device of claim 1, wherein replacing at least a portion of the stored sensor data comprises discounting a portion of the sensor data that is stored in a given FIFO queue of the one or more FIFO queues when the given FIFO queue is full, such that additional sensor data for a subsequent interval may be stored into the given FIFO queue.

3. The mobile device of claim 2, wherein discounting the portion of the sensor data that is stored in the given FIFO queue comprises erasing an element of sensor data at a front of the given FIFO queue.

4. A mobile device comprising:
   one or more sensors;
   a memory;
   a sensor processor, the sensor processor configured to:
      receive sensor data using the one or more sensors on an interval basis,
      store the sensor data into one or more first-in, first-out (FIFO) queues in the memory as the sensor data is received,
      replace at least a portion of the stored sensor data if a main application processor of the mobile device does not request the stored sensor data within a certain amount of time, wherein replacing at least a portion of the stored sensor data comprises discounting a portion of the sensor data that is stored in a given FIFO queue of the one or more FIFO queues when the given FIFO queue is full, such that additional sensor data for a subsequent interval may be stored into the given FIFO queue, and wherein discounting the portion of the sensor data that is stored in the given FIFO queue comprises: determining that one or more elements of sensor data stored in the given queue are indicative that the mobile device is at rest for an elapsed period of time, and erasing the determined one or more elements from the given FIFO queue,
   a main application processor, the main application processor configured to:
      receive data indicating a request for sensor data for a recent time period, and
      in response to receiving the data indicating the request, retrieve the sensor data for the recent time period from the one or more FIFO queues.

5. The mobile device of claim 1, wherein the sensor processor is further configured to receive sensor data using the one or more sensors on an interval basis for a predetermined length of a time in response to receiving a request from the main application processor.

6. The mobile device of claim 1, wherein receiving sensor data using the one or more sensors comprises combining sensor data received from at least two of the one or more sensors.

7. The mobile device of claim 6, wherein combining sensor data received from at least two of the one or more sensors comprises combining sensor data received from an accelerometer and a gyroscope to determine a change in position of the mobile device.

8. The mobile device of claim 1, wherein the one or more sensors comprise at least one of the following types of sensors: a global positioning system, a Wi-Fi sensor, a gyroscope, an accelerometer, a magnetic sensor, and a pressure sensor.

9. The mobile device of claim 1, wherein the sensor processor is further configured to receive the sensor data using the one or more sensors on an interval basis while the main application processor is inactive and the mobile device is in a sleep mode.

10. The mobile device of claim 1, wherein the main application processor is further configured to determine, using the retrieved sensor data for the recent time period, an estimate of a geographic location of the mobile device.

11. A method of batching sensor data while a main application processor of a mobile device is in an inactive state, the method comprising:
   receiving, by a sensor processor and from the main application processor, data indicating a request to collect sensor data using one or more sensors of the mobile device, wherein the sensor processor is configured to collect sensor data using less power than the main application processor uses when determining sensor data;
   in response to receiving the data indicating the request, the sensor processor receiving sensor data using the one or more sensors on an interval basis;
   storing, by the sensor processor, the received sensor data into one or more first-in, first out (FIFO) queues of a memory;
   determining, by the sensor processor, that a given one of the one or more FIFO queues is full; and in response to determining that a given one of the one or more FIFO queues is full, discounting, by the sensor processor, a portion of the sensor data that is stored in the given FIFO queue of the one or more FIFO queues, such that additional sensor data for a subsequent interval may be stored into the given FIFO queue, wherein discounting comprises:

determining that the portion of the sensor data that is stored in the given FIFO queue is indicative that the mobile device is at rest for an elapsed period of time; and erasing the portion of the sensor data from the given FIFO queue.

12. The method of claim 11, wherein discounting the portion of the sensor data that is stored in the given FIFO queue comprises erasing an element of sensor data at a front of the given FIFO queue.

13. The method of claim 11, wherein receiving the sensor data using the one or more sensors comprises combining sensor data received from at least two of the one or more sensors.

14. The method of claim 13, further comprising:
receiving, by the sensor processor and from the main application processor, a determined position of the mobile device, and wherein combining sensor data received from at least two of the one or more sensors comprises:
combining sensor data received from an accelerometer and a gyroscope to calculate a change in position of the mobile device; and advancing the determined position of the mobile device based on the calculated change in position.

15. The method of claim 11, wherein the one or more sensors comprise at least one of the following types of sensors: a global positioning system, a Wi-Fi sensor, a gyroscope, an accelerometer, a magnetic sensor, and a pressure sensor.

16. A non-transitory computer-readable medium having stored therein instructions, that when executed by a sensor processor, cause the sensor processor to perform functions comprising:

receiving, from a main application processor of a mobile device, data indicating a request to collect sensor data using one or more sensors of the mobile device;

in response to receiving the data indicating the request, receiving sensor data using the one or more sensors on an interval basis without using the main application processor;

storing the received sensor data into one or more first-in, first out (FIFO) queues of a memory;

determining that a given one of the one or more FIFO queues is full; and in response to determining that a given one of the one or more FIFO queues is full, discounting a portion of the sensor data that is stored in the given FIFO queue of the one or more FIFO queues, such that additional sensor data for a subsequent interval may be stored into the given FIFO queue, wherein discounting comprises:

determining that the portion of the sensor data that is stored in the given FIFO queue is indicative that the mobile device is at rest for an elapsed period of time and erasing the portion of the sensor data from the given FIFO queue.

17. The non-transitory computer-readable medium of claim 16, wherein discounting the portion of the sensor data that is stored in the given FIFO queue comprises erasing an element of sensor data at the front of the given FIFO queue.

18. The non-transitory computer-readable medium of claim 16, wherein the one or more sensors comprise at least one of the following types of sensors: a global positioning system, a Wi-Fi sensor, a gyroscope, an accelerometer, a magnetic sensor, and a pressure sensor.

* * * * *